United States Patent
Dar

(10) Patent No.: US 10,285,026 B2
(45) Date of Patent: May 7, 2019

(54) SERVICE SHARING BETWEEN DEVICES

(71) Applicant: T-Mobile USA, Inc., Bellevue, WA (US)

(72) Inventor: Sheraz Dar, Maple Valley, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 37 days.

(21) Appl. No.: 15/672,222

(22) Filed: Aug. 8, 2017

(65) Prior Publication Data

US 2019/0052994 A1    Feb. 14, 2019

(51) Int. Cl.
| | |
|---|---|
| *H04W 4/38* | (2018.01) |
| *H04L 29/06* | (2006.01) |
| *H04W 88/06* | (2009.01) |
| *H04W 4/80* | (2018.01) |
| *H04W 4/10* | (2009.01) |
| *H04L 29/08* | (2006.01) |

(52) U.S. Cl.
CPC ............. *H04W 4/38* (2018.02); *H04L 63/102* (2013.01); *H04W 4/80* (2018.02); *H04W 88/06* (2013.01); *H04L 67/306* (2013.01); *H04W 4/10* (2013.01)

(58) Field of Classification Search
CPC ......... H04W 4/38; H04W 4/80; H04W 88/06; H04W 4/10; H04L 63/102; H04L 67/306
See application file for complete search history.

(56) References Cited

U.S. PATENT DOCUMENTS

| | | |
|---|---|---|
| 2006/0095501 A1 | 5/2006 | Mochida |
| 2010/0162412 A1 | 6/2010 | Muraki |
| 2016/0149966 A1* | 5/2016 | Remash ............... H04L 65/1096 370/351 |
| 2017/0041752 A1 | 2/2017 | Baek et al. |
| 2017/0201850 A1* | 7/2017 | Raleigh ................... H04W 4/50 |

FOREIGN PATENT DOCUMENTS

WO    2004056079 A1    7/2004

OTHER PUBLICATIONS

Campbell, B. et al. "The Message Session Relay Protocol (MSRP)", RFC 7977, Sep. 2007, <www.rfc-editor.org/info/rfc4975>, 64 pages.
International Searching Authority, International Search Report and Written Opinion, PCT Patent Application PCT/US2018/045679, dated Nov. 23, 2018, 11 pages.

* cited by examiner

*Primary Examiner* — Jae Y Lee
(74) *Attorney, Agent, or Firm* — Perkins Coie LLP

(57) ABSTRACT

Systems and methods are described herein for enabling sharing of call and/or messaging services between mobile devices via wireless connection, e.g. a Bluetooth connection. The systems and methods allow a first mobile user to register as a host user. A second mobile user (guest user) sends a service sharing request, via the Bluetooth connection, to the host user's mobile device requesting permission to make calls and/or send messages using the host user's mobile account. When the host user accepts the service sharing request, the service sharing system inserts an identification code of the guest user in the call data record to help identify the actual call/message originating party. Once a transaction is established between the guest user's mobile device and the destination number, via the Bluetooth connection to the host user's mobile device, the service sharing system may monitor the transaction duration to ensure that it does not exceed the specified call duration or other limit.

21 Claims, 6 Drawing Sheets

SERVICE SHARING BETWEEN DEVICES

BACKGROUND

Typically, when a user of a mobile device is in an area where his telecommunications service provider either does not provide service, or has limited service, the user is unable to use call and/or messaging services in that area. A user may also lose call and/or messaging service as a result of non-payment of an outstanding balance associated with his/her account with the telecommunications service provider. However, while a first user may not be able to make calls and/or send messages, a second user in the vicinity of the first user may not suffer from these problems. For example, the second user may have a contract with a second telecommunications service provider that, unlike the first telecommunication service provider of the first user, provides service in a geographic area that allows the second user to make calls and/or send messages.

BRIEF DESCRIPTION OF THE DRAWINGS

Embodiments of the disclosed technology will be described and explained through the use of the accompanying drawings.

Figure 1:
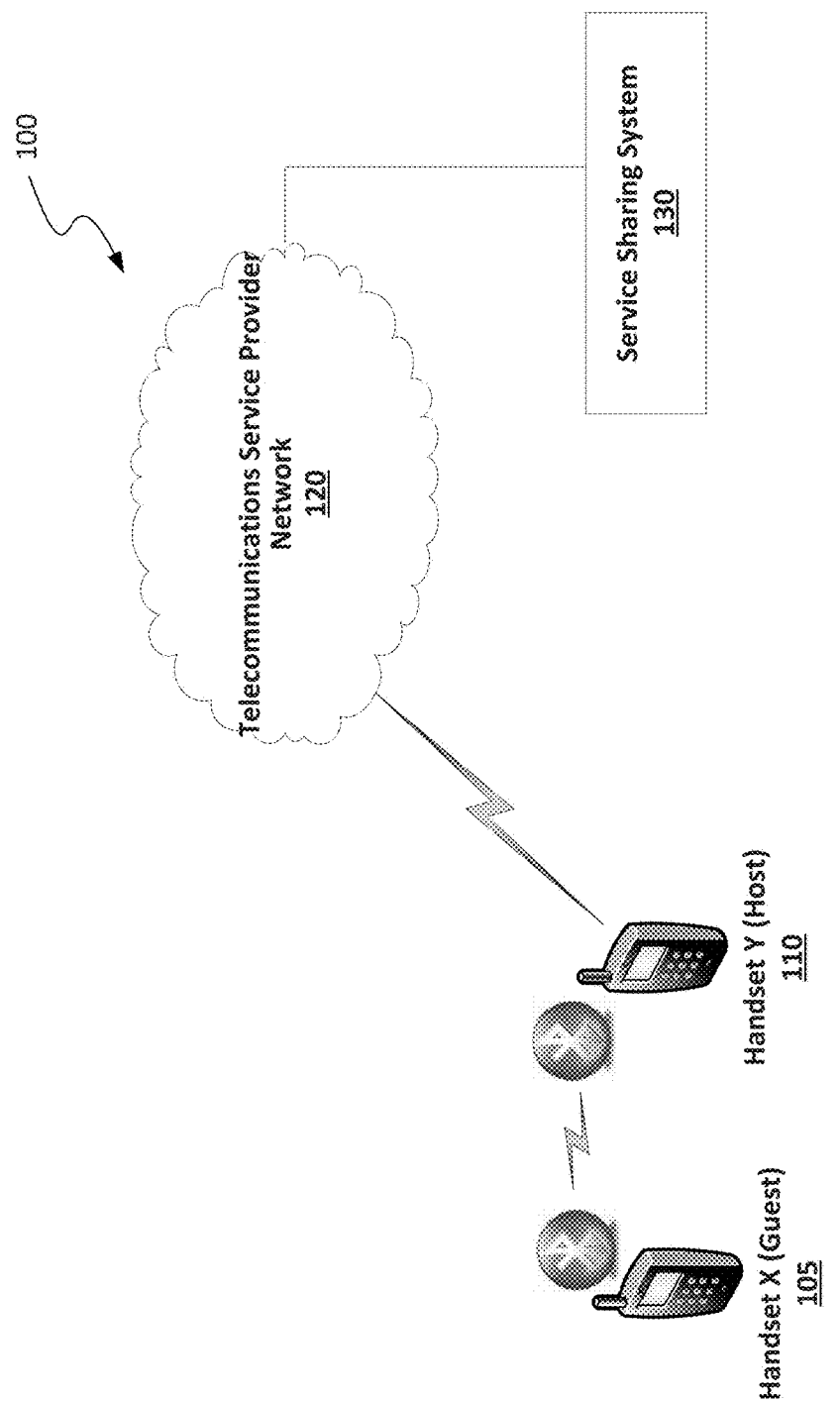
FIG. 1 is a block diagram illustrating a suitable computing environment within which to provide service sharing between mobile devices.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

In light of the above problems, as well as others, the inventors have recognized that it would be beneficial for a first user (guest) to use a first mobile device to connect to a second mobile device of a second user (host) to make calls and/or send messages, wherein the second mobile device has sufficient service to support call completion and/or message transmission/receipt. This may be done by sharing the services of the host mobile device from the guest mobile device via Bluetooth. The host user may grant permission to one or more guest users before the guest users can utilize the host user's services. This feature may be particularly useful in situations where the host device is connected via a WLAN connection (e.g. connected to a nearby WiFi access point), or where the host user has an account with a telecommunications service provider that allows the host user to make unlimited domestic calls and/or send unlimited text/multimedia messages. In these situations, when a host user grants permission to a guest user to use, e.g. the host user's telecommunication account to make calls and/or send messages, the host user may not incur any charges for the guest user's use of the host user's account.

Systems and methods are described herein for enabling sharing of call and/or messaging services between mobile devices via a local or personal wireless connection, e.g. a Bluetooth connection. For example, the systems and methods may allow a first mobile user to register as a host user with his/her telecommunications service provider. A host user may create multiple Bluetooth profiles with different permission attributes for use by different users (or user groups). For example, a basic service sharing Bluetooth profile at the host user's mobile device may only be used to make calls or send messages, but may not be used to access other attributes (e.g., internal storage, etc.) of the host mobile device. A trusted service sharing Bluetooth profile at the host user's mobile device may be used to make calls or send messages, as well as allow the guest user to access certain data stored at the host user's mobile device (e.g., contact list, social media friends, photos, videos, audio files, etc.). The host user may modify permissions associated with Bluetooth profiles using a mobile application.

Further, the host user may specify one or more parameters related to service sharing, such as maximum number of calls, maximum duration of each call, average duration of each call, maximum number of text messages, maximum number of multimedia messages, authorized list of users, authorized list of telecommunications service providers, etc. A second mobile user (guest user) may send a request, via a Bluetooth connection, to the host user's mobile device requesting permission to make calls and/or send messages using the host user's mobile account. The guest user may have an account with a second telecommunications service provider. In some embodiments, the guest user does not have a SIM and instead uses a WiFi or Bluetooth connection to connect to the host user's mobile device to make calls or send messages. Typically, a guest user may request permission to make calls and/or send messages to domestic numbers such that the host user does not incur any additional charge related to the call/message. The host user may grant permission, deny permission, or postpone their decision.

If the host user grants permission to the guest user to user the host user's mobile account to make calls and/or send messages, the call/message may be forwarded to the host user's telecommunications service provider. A service sharing system at the host user's telecommunications service provider may identify that while the call is received from the host user's mobile device, it originated from the guest user's mobile device. The service sharing system may confirm that the host user has granted permission/consent to allow completion of guest user calls and/or messages. The consent may be a one-time blanket consent stored at the service sharing system, or it may be a real-time consent acquired at the time of each call/message. The service sharing system may perform destination number analysis to make sure that the destination number associated with the call/message is domestic and will not incur charges. In some embodiments, the service sharing system may compute a cost value associated with the serve sharing request. The cost value may be based on one or more factors, such as, type of transaction (call, message, data, etc.), destination number, call duration, message length, impact on battery of host mobile user, etc. The service sharing system may evaluate whether the cost value is below a certain transaction charge threshold amount when determining consent/permissions associated with the service sharing request. The transaction charge threshold amount may be based on one or more factors, such as, type of transaction (call, message, data, etc.), timestamp of service sharing request (e.g., requests generated during certain times might have a higher threshold than those generated at other times), business of host user's mobile device, business of network, special circumstances (e.g., emergencies), etc.

In some embodiments, the host user may grant consent for guest users to use a predetermined amount (dollar, time, etc.) of long-distance services. The service sharing system may restrict calls to a particular call duration so that the host user's mobile device/account is not engaged for too long. Call duration may be predetermined or may depend on one or more factors (e.g., busyness of network, occurrence of special events (e.g., emergencies), etc.

Once the service sharing system determines that the guest user has the required consents/permissions, the service sharing system may insert a unique identification code (e.g., the guest user's Mobile Station International Subscriber Directory Number (MSISDN), international mobile station equipment identity (IMEI), International Mobile Subscriber Identity (IMSI), and/or any other unique identification number) in the call data record (as a new service sharing indicator (e.g., header, tag, etc.)) to help identify the actual call/message originating party. The service sharing system may also insert the guest user's unique identification code in call flow to ensure that any legal intercept related warrants are fulfilled. Once a call is established between the guest user's mobile device and the destination number, via a Bluetooth connection to the host user's mobile device, the service sharing system may monitor the call duration to ensure that the call does not exceed the specified call duration. At the end of the specified call duration, the service sharing system may handle termination of the call.

Various embodiments of the system will now be described. The following description provides specific details for a thorough understanding and an enabling description of these embodiments. One skilled in the art will understand, however, that the system may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Suitable Computing Environments

FIG. 1 is a block diagram illustrating a suitable computing environment 100 within which to provide service sharing between mobile devices. A guest mobile device 105 may request a connection, via Bluetooth, with a host mobile device 110. The host mobile device 110 may alert the host user of the incoming service sharing request from the guest mobile device. The host user may receive a second request from the guest mobile device to make a voice call or transmit a message using the host user's account with a telecommunications service provider 120. In some embodiments, the request for a connection and the request to make a voice call or transmit a message may be combined into a single service sharing request. Based on one or more settings at the host mobile device, the host user may accept, decline, and or postpone a decision on the service sharing request from the guest mobile device. If the host user accepts the request, the host user's mobile device may forward the call or message to the telecommunications service provider 120. A unique identification code associated with the guest mobile device may be transmitted by the host mobile device as part of the call/message processing. The unique identification code may be transmitted as part of a new service sharing feature tag. The service sharing feature tag informs the telecommunications service provider that while the call/message is being processed from the host mobile device, the call/message is originating from a different originating number (the unique identification number associated with the guest device). In some embodiments, when the guest device is associated with multiple unique identification codes (e.g., multiple IMSIs, multiple MSISDNs etc.), the service sharing feature tag will comprise only one of the multiple unique identification codes to uniquely identify the guest mobile device.

A service sharing system 130 associated with and provided by the telecommunications service provider 120 processes, monitors, and manages the service sharing request. When the host mobile device initiates a service sharing call/message, a receiving server (e.g., a Proxy-Call Session Control Function (P-CSCF)) at the telecommunications service provider network 120 may identify the call/message as being a service sharing call/message based on, for example, the service sharing feature tag, and route the call for processing to the service sharing system 130 instead of routing the call/message to an Interrogating-CSCF (I-CSCF). The service sharing system 130 may check for consent/permissions of the host user relating to call/message requests from guest users. The service sharing system 130 may also perform destination number analysis to confirm that the destination number is a domestic number and that the host user will not incur any additional call/message charges associated with the service sharing request. The service sharing system 130 may monitor the calls originated via a service sharing request to ensure that the service sharing call duration does not exceed a predetermined call duration. Further, the service sharing system 130 may store collected data, such as data collected from the host mobile device 110 or other data sources.

FIG. 1 and the discussion herein provide a brief, general description of a suitable computing environment 100 in which the service sharing system 130 can be supported and implemented. Although not required, aspects of the service sharing system 130 are described in the general context of computer-executable instructions, such as routines executed by a general-purpose computer, e.g., mobile device, a server computer, or personal computer. The system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

In some embodiments, the guest mobile device 105, the host mobile device 110, and/or the service sharing system 130 may include network communication components that enable the devices to communicate with remote servers or other portable electronic devices by transmitting and receiving wireless signals using a licensed, semi-licensed, or unlicensed spectrum over communications networks, such as network 120. In some cases, the communication network 120 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The communications network 120 may also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), or other communications networks.

Figure 2:
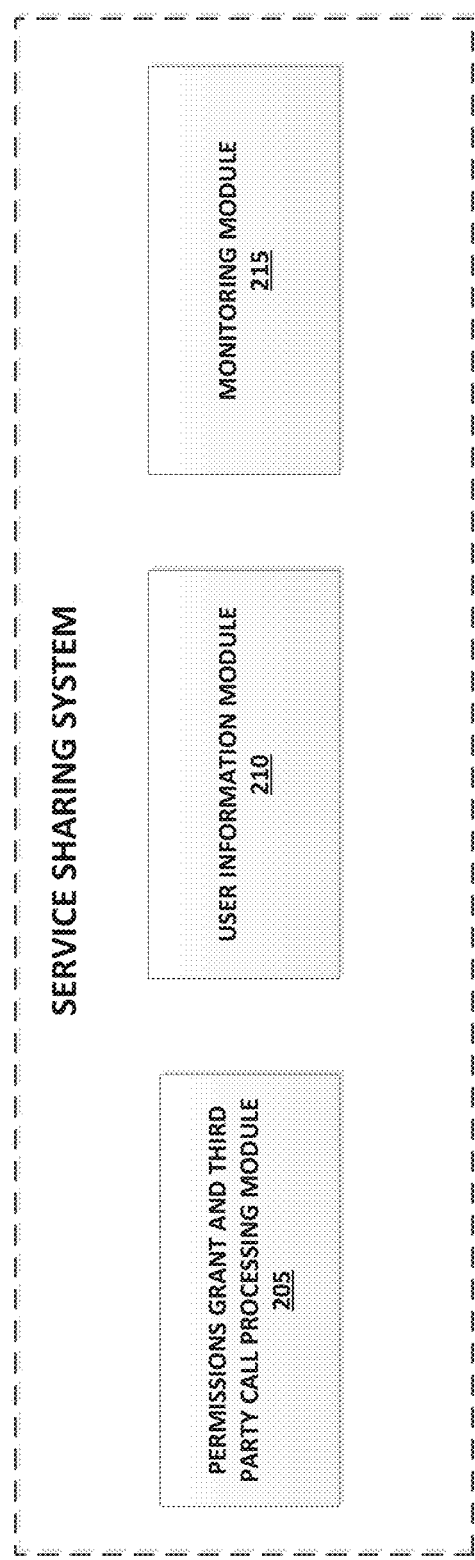
FIG. 2 is a block diagram illustrating the components of a service sharing system.

FIG. 2 is a block diagram illustrating the components of a service sharing system. The service sharing system 130 may include functional modules that are implemented with a combination of software (e.g., executable instructions, or computer code) and hardware (e.g., at least a memory and processor). Accordingly, as used herein, in some examples a module is a processor-implemented module or set of code and represents a computing device having a processor that is at least temporarily configured and/or programmed by executable instructions stored in memory to perform one or more of the particular functions that are described herein. For example, service sharing system 130 may include a permissions grant and third party call processing module 205, a user information module 210, and a monitoring module 215.

In some embodiments, the permissions grant and third party call processing module 205 is configured and/or programmed to receive a Session Initiation Protocol (SIP) message via a P-CSCF in the telecommunications service provider network of the host user. In some embodiments, the SIP message comprises a service sharing indicator (e.g., header, tag, etc.). The service sharing indicator includes a unique identification code that uniquely identifies the originating party (i.e., the guest user or guest device). Upon receiving the SIP message, the permissions grant and third party call processing module 205 may perform destination number analysis to confirm that the destination number is a domestic number and that the host user will not incur any additional call/message charges associated with the service sharing request. In some embodiments, the permissions grant and third party call processing module 205 may compute a cost value associated with the service sharing request. The cost value may be compared with a transaction charge threshold amount to determine whether the service sharing request will be allowed. In some embodiments, when the cost value is greater than the transaction charge threshold amount, the permissions grant and third party call processing module 205 may deny the service sharing request and send a message to the host user's mobile device. When the cost value is less than the transaction charge threshold amount, the permissions grant and third party call processing module 205 generates call data records (CDRs) for the service sharing request. The CDRs can identify the guest user's unique identification code (received as part of the service sharing indicator) as the caller and the host user's unique identification code as the anchor. Further, the permissions grant and third party call processing module 205 transmits the SIP message, with the service sharing indicator to an Interrogating-CSCF for call/message processing.

The user information module 210 is configured and/or programmed to access user information to determine, for example, consent/permissions granted by the host user. For instance, the user information module 210 may access a database to determine one or more consent/permission records associated with the host user. As an example, a host user may be associated with consent/permission records that identify one or more of the following: a list of authorized users (for whom permission is pre-granted), maximum number of minutes per call, maximum number of calls, maximum number of messages, etc. The consent/permissions record may further identify the validity of each record (e.g., daily, weekly, monthly, custom time period, etc.). In some embodiments, the user information module 210 manages the history of service sharing requests for a host user. For example, the user information module 210 may access a database to determine a history of service sharing requests that the user has received for a specified time period.

The monitoring module 215 is configured and/or programmed to monitor calls originated via a service sharing request to ensure that the service sharing call duration does not exceed a predetermined call duration. For example, for a service sharing request involving a call or chat session transaction, when the permissions grant and third party call processing module 205 transmits the SIP message, with the service sharing indicator to an Interrogating-CSCF (I-CSCF) node for call/message processing, the monitoring module 215 may start a timer as time=0. When the timer reaches the predetermined call duration, the monitoring module 215 may transmit a call disconnect message so that the service sharing call is terminated.

Figure 3:
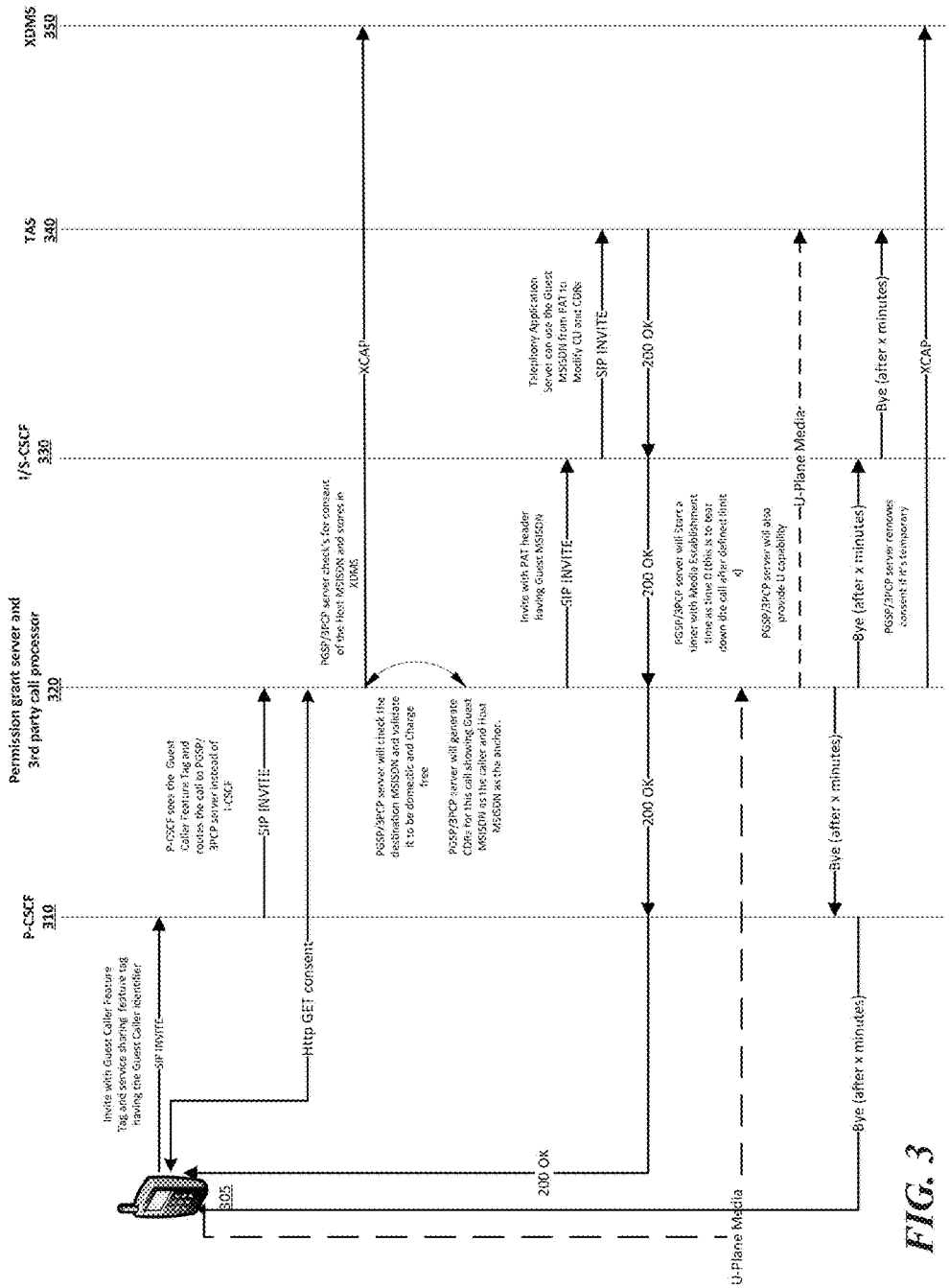
FIG. 3 is a flow diagram illustrating a method of handling a service sharing call within an IMS network.

FIG. 3 is a flow diagram illustrating a method of handling a service sharing call within an IMS network. A host user's mobile device 305 receives a service sharing request from a guest mobile device. After performing initial validations, the host mobile device 305 attempts to establish a session between the host mobile device 305 and a P-CSCF node 310 of the IMS network. The host mobile device 305 sends a SIP INVITE message to a P-CSCF node 310. The SIP INVITE message comprises a guest caller feature tag and/or a service sharing feature tag. The guest caller feature tag informs the P-CSCF node 310 that the host user's mobile device 305 is capable of handling service share requests for calls and/or messages from a guest user. The service sharing feature tag comprises a unique identification code associated with, e.g. the guest mobile device. The service sharing feature tag may be the same as an existing header/tag in a SIP invite message (e.g., a P-Associated-Form (PAF) header).

Upon receiving the guest feature tag and/or the service sharing feature tag, the P-CSCF node 310 utilizes its header manipulation rules to determine that the SIP INVITE message was originated by a service sharing request. The P-CSCF node 310 sends a SIP INVITE message to a permission grant server and third party call processor (PGSP/3CP) node 320, instead of sending the SIP INVITE message directly to a I-CSCF node 330. The PGSP/3CP node 320 is specially programmed to handle calls/messages originating from a service sharing request. In some embodiments, some or all functions performed by the PGSP/3CP node 320 may be performed by an application server (e.g., telephony application server 340). The PGSP/3CP node 320, upon receiving the SIP INVITE message from the P-CSCF node 310, checks for consent/permissions associated with the host user's mobile device.

Figure 5:
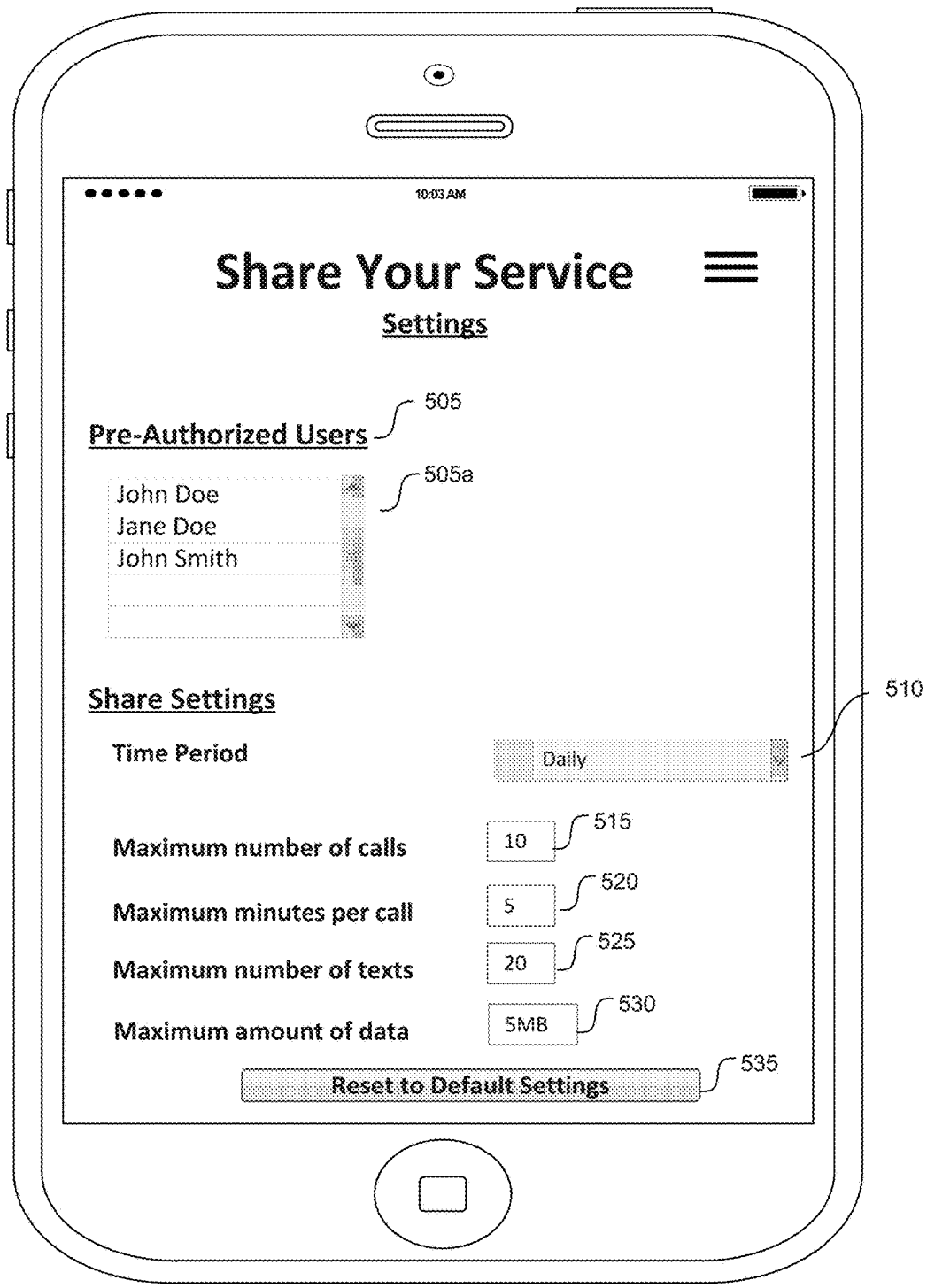
FIG. 5 is a display diagram illustrating an example user interface for configuring service sharing parameters for a mobile user.

The host user may have one or more service sharing profiles (with associated consent/permissions) for service sharing request. For example, as illustrated in FIG. 5, the host user may specify the following consent/permissions parameters: pre-authorized users 505 (with a list of users 505a), time period 510, maximum number of calls 515, maximum minutes per call 520, maximum number of texts 525, maximum amount of data 530, etc. The consent/permissions parameters may be associated with a default profile, and/or specific guest user service sharing profile (e.g., family, friends, co-workers, etc.). The host user may be able to reset certain parameter values to default settings by activating the reset to default settings 535 option. The host user may also define global consent/permissions for each type of service sharing. For example, the host user may define the maximum number calls, texts, and/or data that he/she is willing to share across all guest user profiles. For data service sharing, the host user may designate a certain pool of data as shareable data.

Figure 4:
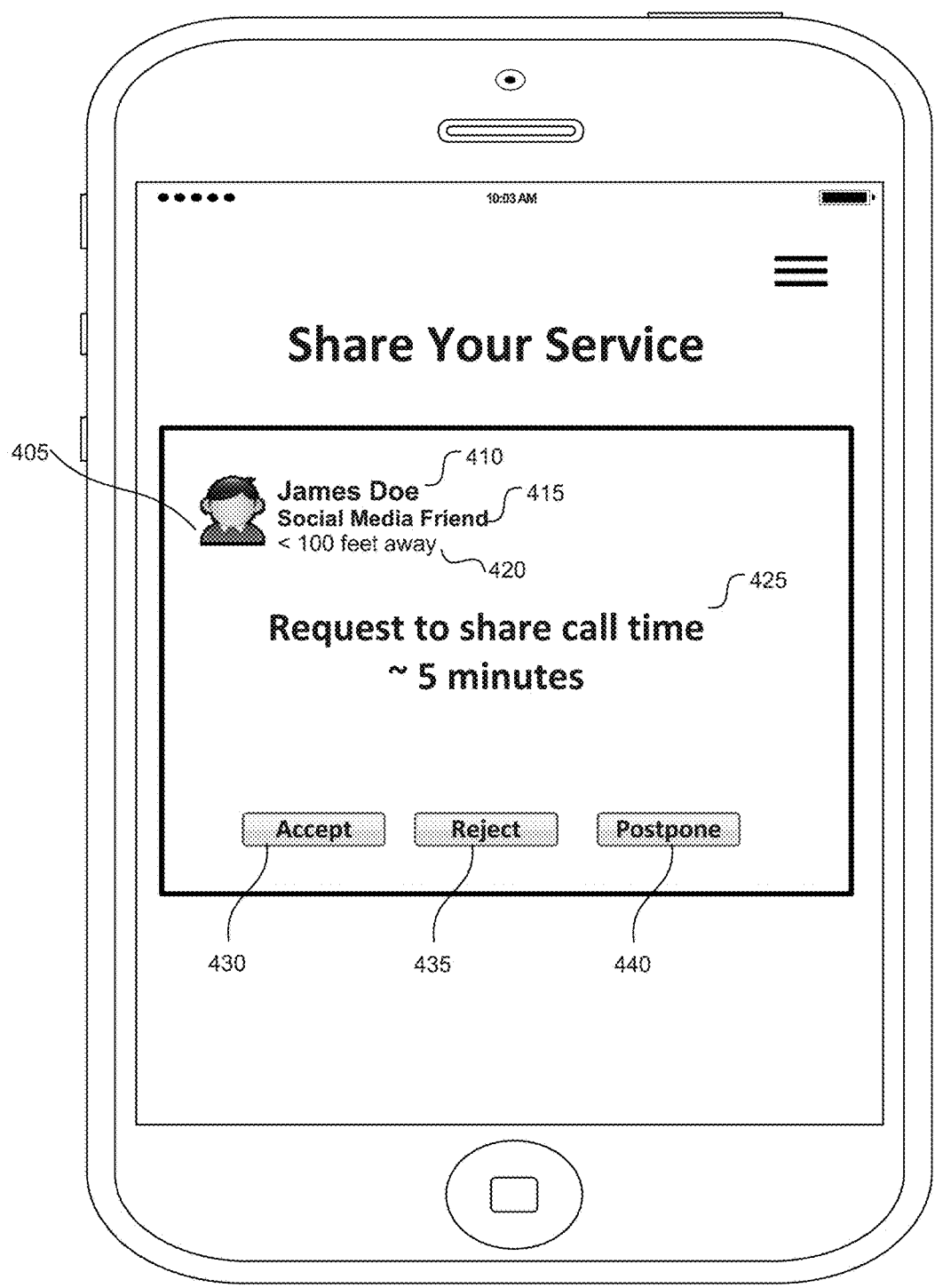
FIG. 4 is a display diagram illustrating an example user interface presenting information associated with a service sharing request.

The PGSP/3CP node 320 may send a Http GET consent message to the host user's mobile device 305 to confirm consent/permissions associated with the service sharing request. In some embodiments, the host user's mobile device 305 may send consent/permissions associated with the service sharing request using a Http POST message. For example, the host user's mobile device may display a user interface, such as that illustrated in FIG. 4. The host user may be presented with an alert/notification (e.g., a visual alert (flashing screen, blinking light, etc.), an audio alert (e.g., beep, vibration, etc.), etc.) that informs the host user that a guest user is requesting the host user to share his/her network to make a call or send a message. As illustrated in FIG. 4, the host user may be presented information related to the guest user requesting the service sharing request, such as the guest user's picture (405), guest user's name (410), guest user's location (e.g., within 100 feet) (420), guest user's affiliation (e.g., guest user is part of the host user's social media network, guest user is part of the host user's contact list, guest user is part of a predefined group (e.g., family, friends, co-workers, etc.)) (415), etc. The host user may be further presented with information related to the service sharing request 425, such as the type of service (e.g., call, text message, multimedia message, data sharing, etc.), the expected duration of service sharing (e.g., 5 minutes, 10 minutes, etc.), etc. The host user may be presented with an option to accept the request 430, reject the request 435, or postpone the request 440. For example, if the host user selects the option of postponing the request (by selecting option 440), the host user can specify that the request be postponed for a predetermined amount of time, or for a custom amount of time (e.g., by entering a time duration in a prompt window). At the end of the postponement period, the host user can specify that the service sharing request be processed without any further user interaction, or that the host user be reminded (and/or prompted) with the service sharing request so that the host user can then accept, reject, or further postpone the service sharing request. In some embodiments, the host user may grant consent/permission via, for example, the user interface illustrated in FIG. 4, prior to sending the SIP INVITE message to the P-CSCF node 310. The P-CSCF node 310 may then inform the PGSP/3CP node 320 of the appropriate consent/permissions when it transmits the SIP INVITE to the PGSP/3CP node 320.

When the host user accepts the service sharing request, it sends a message to the PGSP/3CP node 320 informing it of the consent/permissions (e.g., as an XML document). The PGSP/3CP node 320 stores the consent/permissions in a documents management server (e.g., XML Document Management Server (XDMS) 350). In some embodiments, based on the type of service share request (call, text, and/or data), the PGSP/3CP node 320 may check whether the host user has granted appropriate consent/permission for the requested amount in the service sharing request by accessing one or more configuration files stored in a database of user profiles. In some embodiments, the user profile database may store user consent/permissions associated with service sharing profiles of one or more host users.

Further, the PGSP/3CP node 320 processes the service sharing request and processes the destination party's number (e.g., the destination MSISDN). Based on the destination party's number, the PGSP/3CP node 320 determines whether the call associated with the service sharing request will incur any call charges (e.g., long-distance). For example, if the destination party's number is a domestic number, the call associated with the service sharing request will not incur long-distance call charges. Similarly, even if the destination party's number is not a domestic number (e.g., it is an international number), if the host user's account with his/her telecommunications service provider allows the host user to make calls to the dialed country without incurring long-distance charges (e.g., the host user can make free calls to certain international countries), then the call associated with the service sharing request may not incur long-distance call charges. In some embodiments, when a cost value associated with the service sharing request is greater than a transaction charge threshold amount, the PGSP/3CP node 320 may deny the service sharing request and send a message to the host user's mobile device 305.

After performing one or more checks, the PGSP/3CP node 320 generates call data records (CDRs) for the service sharing request. The CDRs can identify the guest user's unique identification code (received as part of the service sharing feature tag) as the caller and the host user's unique identification code as the anchor. Further, the PGSP/3CP node 320 transmits a SIP INVITE message, with the service sharing feature tag, to a Interrogating-CSCF (I-CSCF) node 330 for call/message processing. The I-CSCF node 330 transmits the SIP INVITE to a Telephony Application Server (TAS) node 340 (or a messaging server (e.g., IMP Server) for text messages). The TAS node 340 receives the guest's unique identification code as part of the service sharing feature tag and may use it to modify the call line identification (CLI) parameter in the CDRs prior to transmitting the call to the destination number. The mobile device associated with the destination number may then display the number of the actual caller (i.e., the guest user's telephone number). The TAS node 340 may then return a call establishment confirmation message to the host mobile device to confirm that a call was established between the host user's mobile device and the destination mobile device.

When the call is established, the PGSP/3CP node 320 may start a timer to monitor the duration of the service sharing call. When the timer reaches a predetermined call duration, the PGSP/3CP node 320 transmits a call disconnect message (e.g., SIP BYE message) so that the service sharing call is terminated. The host user's mobile device may then present an alert informing the user that the service sharing call will be disconnected. Further, based on the consent/permissions preferences of the host user, the PGSP/3CP node 320 may update the consent from the XDMS node 350 (e.g., deletes the consent if it is temporary, permanently store the consent if it is permanent, etc.). Moreover, legal intercepts (e.g., associated with warrants) may be handled by the PGSP/3CP node 320.

Figure 6:
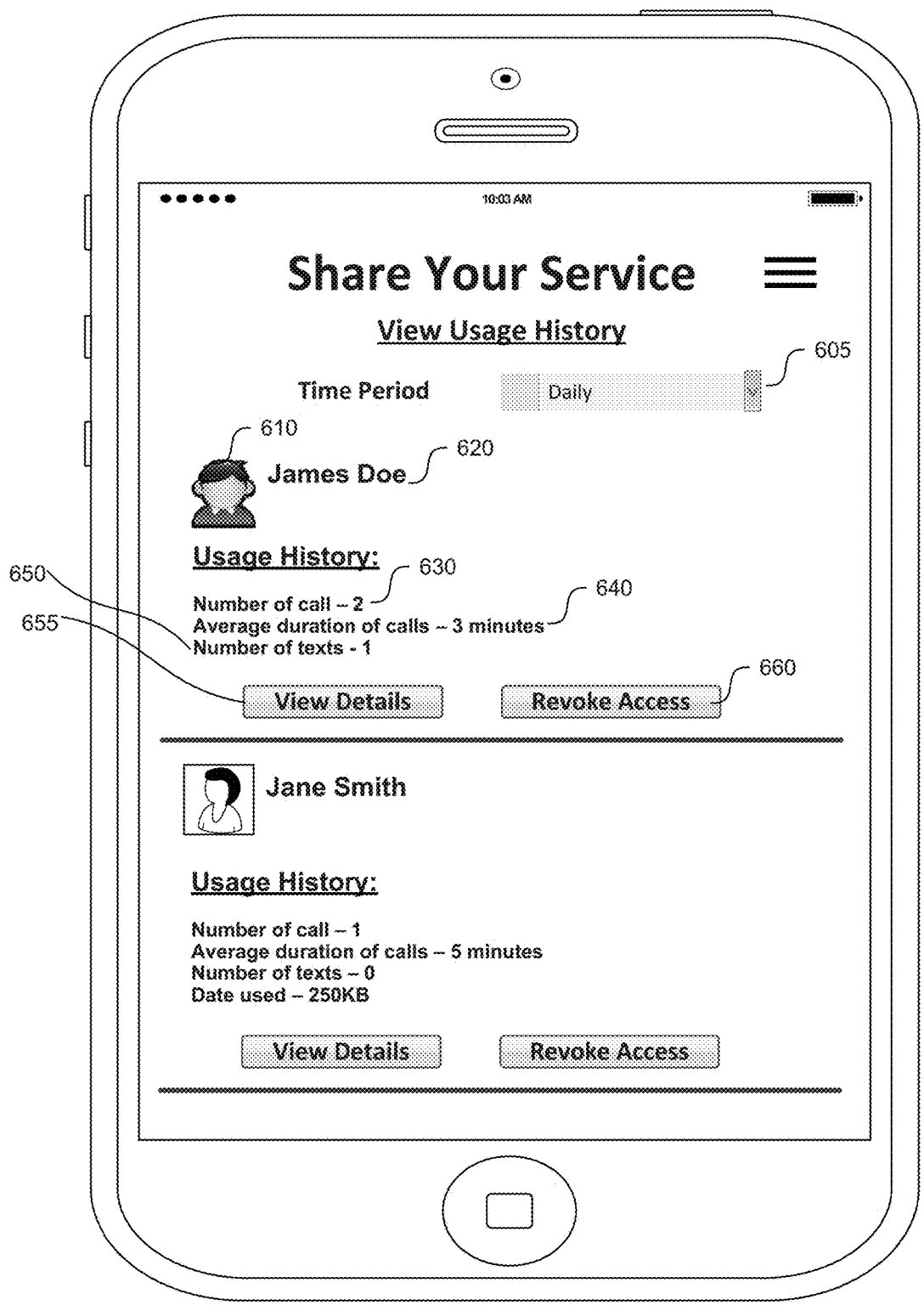
FIG. 6 is a display diagram illustrating an example user interface for viewing a service sharing usage history.

FIG. 6 is a display diagram illustrating an example user interface for viewing a service sharing usage history. As illustrated in FIG. 6, a host user may view one or more service share requests that he/she has received. The host user may specify a time period 605 for which he/she wants to view service sharing requests history (e.g., daily, weekly, bi-weekly, monthly, or any custom time period). The user interface then displays details of the service sharing requests, such as a the guest user's picture (610), guest user's name (620), and a summary of the service-sharing usage history (e.g., number of calls made 630, average duration of each call 640, number of texts sent 650, etc.). The host user can view additional details for each service sharing request received (e.g., receipt time, type of transaction (e.g., call, text, or data usage), duration of transaction, status of transaction (e.g., accepted, rejected, postponed, etc.), charges incurred by transaction, if any, etc. by selecting the view details option 655 The host user may revoke consent/permissions for a guest user by selecting the revoke access option 660. When the host user selected the revoke access option 660, the host user's mobile device may update the database where one or more consent/permission records of the host user are stored.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively or additionally, network elements performing those functions could be replaced by two or more elements to perform portions of those functions. In addition, while processes, message/data flows, or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes, message/data flows, or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges. Those skilled in the art will also appreciate that the actual implementation of a database may take a variety of forms, and the term "database" is used herein in the generic sense to refer to any data structure that allows data to be stored and accessed, such as tables, linked lists, arrays, etc.

The teachings of the methods and system provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the technology can be modified, if necessary, to employ the systems, functions, and concepts of the various references described above to provide yet further embodiments of the technology.

These and other changes can be made to the invention in light of the above Detailed Description. While the above description describes certain embodiments of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the technology.

I claim:

1. At least one computer-readable memory carrying instructions to be executed by at least one processor, wherein the instructions are performing a method for accessing wireless communications services, the method comprising:
   receiving, at a host mobile device, a message comprising a service sharing request from a guest mobile device, wherein the service sharing request comprises a request, by the guest mobile device, to perform a transaction by temporarily using a service of the host mobile device, and
      wherein the service sharing request comprises, in a service sharing feature tag, an identifier of the guest mobile device;
   transmitting the service sharing request to a permissions grant server,
      wherein the service sharing request is validated by the permissions grant server based on at least one permission parameter associated with the host mobile device,
      wherein a transaction data record message is generated and transmitted by the permissions grant server,
      wherein an origination parameter of the transaction data record message is set to the identifier of the guest mobile device and parameter of the transaction data record is set to a unique identifier of the host mobile device,
      wherein a transaction data record message is transmitted to a recipient node to handle the transaction, and
   receiving, at the host mobile device, a service sharing confirmation message from the permission grant server,
      wherein the service sharing confirmation message alerts the host mobile device that the service sharing request is accepted.

2. The at last one computer readable memory of claim 1, wherein the transaction is one of: a telephone call, a text message, a multimedia message, or a data transaction, and wherein the guest device is associated with another account with a second, different telecommunications service provider.

3. The at last one computer readable memory of claim 1, wherein the identifier of the guest mobile device is one of: Mobile Station International Subscriber Directory Number (MSISDN), international mobile station equipment identity (IMEI), International Mobile Subscriber Identity (IMSI), or any combination thereof.

4. The at last one computer readable memory of claim 1, wherein the unique identifier of the host mobile device is one of: Mobile Station International Subscriber Directory Number (MSISDN), international mobile station equipment identity (IMEI), International Mobile Subscriber Identity (IMSI), or any combination thereof.

5. The at least one computer-readable memory of claim 1, wherein the method further comprises: determining a cost value of the service sharing request, wherein the cost value of the service sharing request is based on a destination number associated with the service sharing request.

6. The at least one computer-readable memory of claim 5, wherein when the cost value is greater than a transaction charge threshold amount, denying the service sharing request.

7. The at least one computer-readable memory of claim 1, wherein a host user of the host mobile device has an account with a first telecommunications service provider, and a guest user of the guest mobile device has an account with a second telecommunications service provider, wherein the first telecommunications service provider is different than the second telecommunications service provider.

8. The at least one computer-readable memory of claim 1, wherein the at least one permission parameter associated with the host mobile device comprises:
   a set of pre-authorized users,
   time period,
   maximum number of transactions,
   maximum number of calls,
   maximum minutes per call,
   maximum number of texts,
   maximum amount of data,
   or any combination thereof.

9. The at least one computer-readable memory of claim 1, wherein the message comprising a service sharing request from a guest mobile device is presented as an alert at the host mobile device.

10. The at least one computer-readable memory of claim 9, wherein the alert is presented as a visual alert, an audio alert, a haptic alert, or any combination thereof.

11. The at least one computer-readable memory of claim 9, wherein the alert is presented at a user interface at the host mobile device, and wherein the user interface displays:
   the identifier of the guest mobile device,
   identifier of a guest user associated with the guest mobile device,
   image of the guest user,
   name of the guest user,
   location of the guest user,
   affiliations of the guest user,
   social media affiliations of the guest user,
   types of services requested in the service sharing request,
   expected duration of service sharing,
   or any combination thereof.

12. The at least one computer-readable memory of claim 9, wherein the alert is presented at a user interface at the host mobile device, and wherein the user interface displays an option to accept the service sharing request, an option to reject the service sharing request, an option to postpone the service sharing request, or any combination thereof.

13. The at least one computer-readable memory of claim 9, wherein when the option to postpone the service sharing request is selected, receiving via the user interface a value for a postponement time period.

14. A method for accessing wireless communications services, the method comprising:
receiving, at a host mobile device, a message comprising a service sharing request from a guest mobile device,
wherein the service sharing request comprises a request, by the guest mobile device, to perform a transaction by temporarily using a service of the host mobile device, and
wherein the service sharing request comprises, in a service sharing feature tag, an identifier of the guest mobile device;
transmitting the service sharing request to a permissions grant server,
wherein the service sharing request is validated by the permissions grant server based on at least one permission parameter associated with the host mobile device,
wherein a transaction data record message is generated and transmitted by the permissions grant server,
wherein an origination parameter of the transaction data record message is set to the identifier of the guest mobile device and a parameter of the transaction data record is set to an identifier of the host mobile device,
wherein the transaction data record message is transmitted to a recipient node to handle the transaction, and
receiving, at the host mobile device, a service sharing confirmation message from the permissions grant server,
wherein the service sharing confirmation message alerts the host mobile device that the service sharing request is accepted.

15. The method of claim 14, wherein the transaction is one of: a telephone call, a text message, a multimedia message, or a data transaction, and wherein the guest device is associated with another account with a second, different telecommunications service provider.

16. The method of claim 14, wherein the identifier of the guest mobile device, or the identifier of the host mobile device, or both is one of: Mobile Station International Subscriber Directory Number (MSISDN), international mobile station equipment identity (IMEI), International Mobile Subscriber Identity (IMSI), or any combination thereof.

17. The method of claim 14 further comprising: determining a cost value of the service sharing request, wherein the cost value of the service sharing request is based on a destination number associated with the service sharing request.

18. The method of claim 14, wherein the message comprising a service sharing request from a guest mobile device is presented as an alert at the host mobile device, and wherein the alert is presented as a visual alert, an audio alert, a haptic alert, or any combination thereof.

19. A host mobile computing device configured to provide service sharing assistance to a guest mobile computing device, the host mobile computing device comprising:
one or more processors;
at least one memory; and
a service sharing component configured to share services by:
receiving a message comprising a service sharing request from the guest mobile device,
wherein the service sharing request comprises a request, by the guest mobile device, to perform a transaction by temporarily using a service of the host mobile device, and
wherein the service sharing request comprises, in a service sharing feature tag, an identifier of the guest mobile device;
transmitting the service sharing request to a permissions grant server,
wherein the service sharing request is validated by the permissions grant server based on at least one permission parameter associated with the host mobile device,
wherein a transaction data record message is generated and transmitted by the permissions grant server,
wherein an origination parameter of the transaction data record message is set to the identifier of the guest mobile device and a parameter of the transaction data record is set to an identifier of the host mobile device,
wherein the transaction data record message is transmitted to a recipient node to handle the transaction, and
receiving a service sharing confirmation message from the permissions grant server,
wherein the service sharing confirmation message alerts the host mobile device that the service sharing request is accepted.

20. The host mobile computing device of claim 19, wherein the transaction is one of: a telephone call, a text message, a multimedia message, or a data transaction, and wherein the guest device is associated with another account with a second, different telecommunications service provider.

21. The host mobile computing device of claim 19, wherein the identifier of the guest mobile device, or the identifier of the host mobile device, or both is one of: Mobile Station International Subscriber Directory Number (MSISDN), international mobile station equipment identity (IMEI), International Mobile Subscriber Identity (IMSI), or any combination thereof.

* * * * *